United States Patent [19]

McNair

[11] Patent Number: 4,794,271

[45] Date of Patent: Dec. 27, 1988

[54] POWER CONTROL METHOD AND APPARATUS

[76] Inventor: Rhett McNair, 4081-G E. LaPalma, Anaheim, Calif. 92807

[21] Appl. No.: 774,552

[22] Filed: Sep. 10, 1985

[51] Int. Cl.[4] .......................... H02J 1/00; H05B 37/00

[52] U.S. Cl. .......................................... 307/38; 307/41; 315/322

[58] Field of Search ........................ 307/11, 12, 30, 36, 307/37, 38, 39, 41; 315/DIG. 4, 322, 318, 88-90, 121, 122; 361/160, 170

[56] References Cited

U.S. PATENT DOCUMENTS 3,917,969 11/1975 Olsen .................................... 307/11

4,075,501 2/1978 Kundo .................................. 307/41

4,322,632 3/1982 Hart ...................................... 307/41

4,480,197 10/1984 Holloway ......................... 307/12 X

*Primary Examiner*—William M. Shoop, Jr.

*Assistant Examiner*—Sharon D. Logan

*Attorney, Agent, or Firm*—James Creighton Wray

[57] ABSTRACT

Power is controlled in a first circuit by a conventional off/on swtich. The power is used by a first device or group of devices connected to the first circuit. A second circuit has a second power-using device or group of devices. The second circuit is connected to the first circuit via an alternate action switch. Upon alternate energizations of the first circuit, power is supplied to the second circuit.

27 Claims, 3 Drawing Sheets

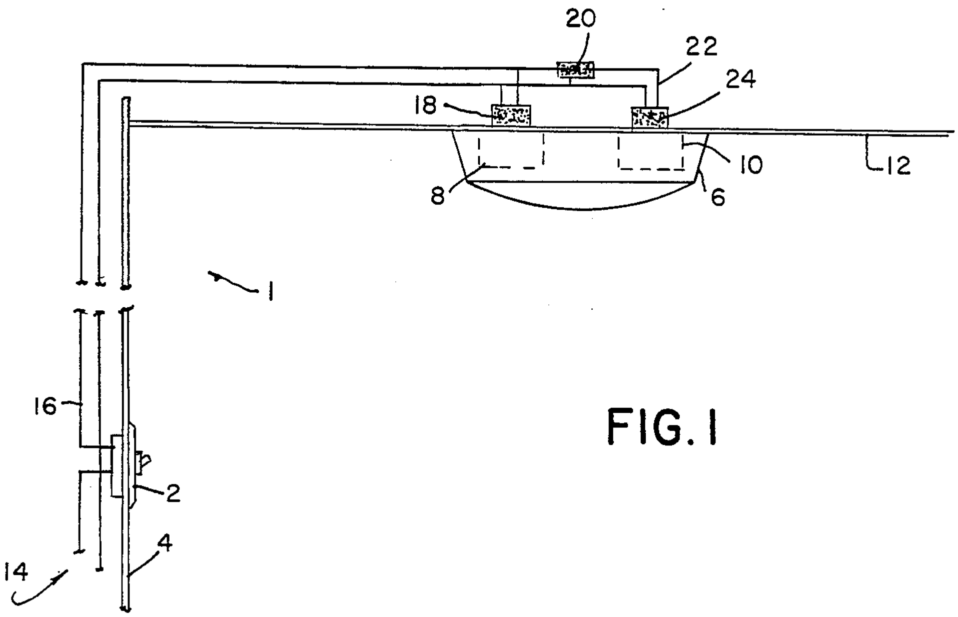
FIG. 1
FIG. 2
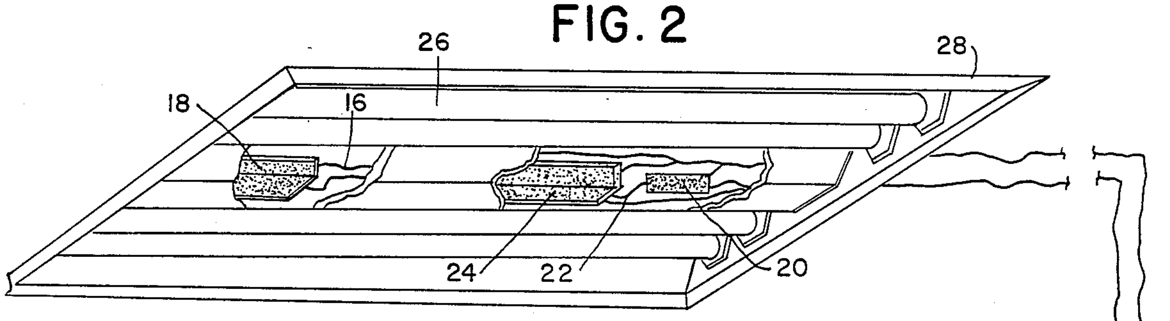
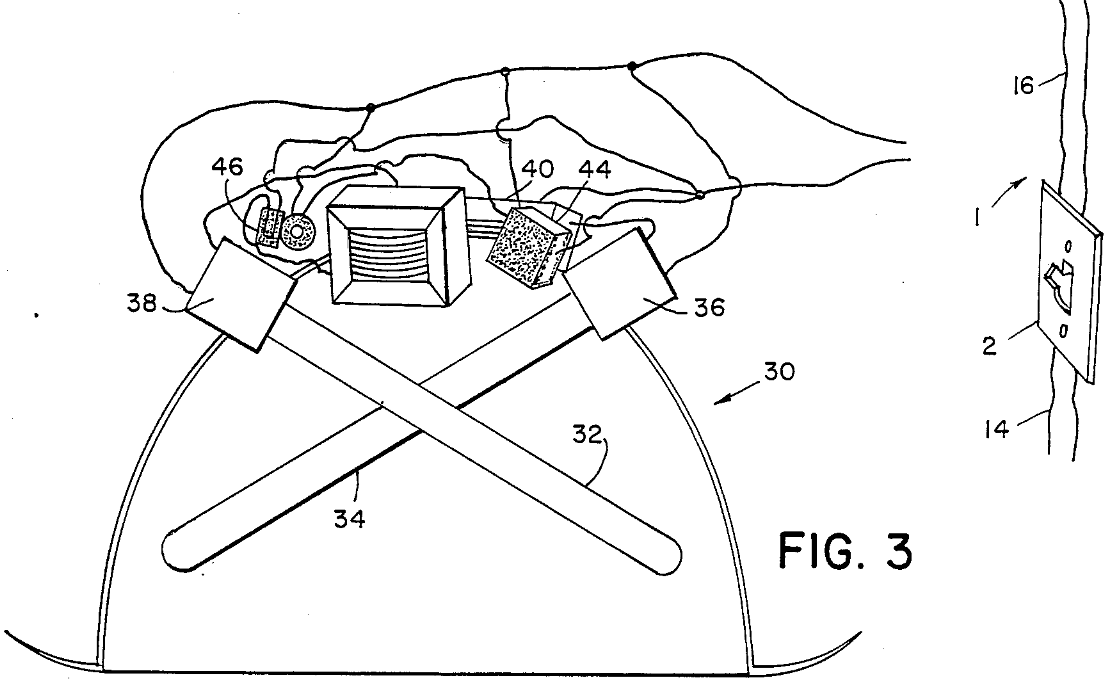
FIG. 3

POWER CONTROL METHOD AND APPARATUS

BACKGROUND OF THE INVENTION

This invention relates to controlling output of power systems. Particularly, the invention relates to the conduction of power to the electrical devices.

In many situations it is desireable to control the application of power to power-using devices. Particularly, it is important to control the output of such devices by controlling the power supply to the devices. For example, the outputs of motors are controlled by the application of power to the motors. The illumination of lamps is controlled by the control of power to the lamps.

In incandescent lamps, power may be readily adjusted by varying resistance or by adjusting potentiometers or by controlling alternate voltage forms with the effect of reducing voltage to lamps and reducing power to lamps.

In some illumination forms, it is difficult to reduce illumination by reducing voltage or power since the forms depend on precise voltages and powers for continued illumination. Reducing or interrupting voltages to such lamps may cause extinguishing or flickering or may reduce lamp life or may reduce the life of operating systems associated with such lamps.

A widely used source of illumination is fluorescent lamps. It has been reported that fluorescent lamps provide the majority of all artificial illumination. Some reports indicate up to 80 percent or more of illumination in developed countries is provided by fluorescent lamps. It is difficult at best and very expensive when possible to change the illumination from fluorescent lamps by changing power. Ordinary wall dimmers for incandescent lamps are ineffective.

While it may be possible to wire separate banks of lamps controlled by separate switches to change illumination within rooms, such separate wiring adds difficulty and expense and materials and labor. Retrofitting old constructions with multiple separately-controlled circuits is expensive and in some cases is extremely difficult.

The present invention overcomes difficulties of the prior art.

SUMMARY OF THE INVENTION

Power is controlled in a first circuit by a conventional off/on switch. The power is used by first devices connected to the first circuit. A second circuit having second power-using devices is connected to the first circuit via an alternate action switch. Upon alternate energizations of the first circuit, power is supplied to the second circuit.

The present invention is primarily directed to controlling the number of electrical devices in operation by switching off and on a conventional wall switch.

Apparatus for alternately switching on and off electrical devices and groups of electrical devices have first and second electrical circuits.

An alternate action switch is connected to the circuits. Electrical means is connected to the switch for alternating condition of the switch to alternately complete and interrupt the second circuit.

The preferred alternate action switch comprises a push ON, push OFF mechanical switch. An actuator is connected to the switch for actuating the switch on operations of the first circuit.

Preferably, the electrical means comprises pulsing means for pulsing the actuator.

Preferred pulsing means comprises means for turning on the electrical means and means for turning off the electrical means.

A preferred means for turning off the electrical means comprises a photosensitive device.

The preferred means for turning off the electrical means further comprises an illuminating means.

Preferably, the photosensitive means comprises means for changing resistance upon presence and absence of illumination. Preferably, the illuminating means comprises a light emitting diode.

Preferably, the light emitting diode is connected to the first circuit to remain on during energization the first circuit.

Preferred control apparatus for switching on and off a second circuit upon alternate energizations of a first circuit comprises an alternate action switch connected to the first circuit and to the second circuit for connecting the first and second circuits on alternate operations of the switch.

Control means is connected to the alternate action switch for operating the switch, the control means being connected to the first circuit for energization when the first circuit is energized.

Preferably means is connected to the first circuit and to the control means for deenergizing the control means after the control means has been energized.

The preferred deenergizing means comprises delay means for delaying deenergization of the control means.

Preferably, the delay means comprises electronic means connected to the first circuit and to the control means and photocell means connected to the electronic means for turning the electronic means off and disconnecting the control means from the primary circuit upon sensing illumination.

An illumination source is connected to the first circuit for illuminating when the first circuit is energized.

A preferred method of turning on and off a second power circuit comprises energizing and deenergizing a first circuit, and connecting the first circuit with the second circuit upon alternate energizations of the first circuit.

Preferably, the first circuit is connected to the second circuit through an alternate action switching means.

Switching the switching means occurs upon energization of the first circuit.

Preferably, one electrically operates the switching means.

A preferred method electromechanically operates the switching means.

The preferred method electronically controls actuation of the switching means.

The preferred method electronically disconnects the switching means from the first circuit after operation of the switching means.

Preferably, a photocell is illuminated in the electronic circuit to electronically disconnect the electronic circuit from the switching means.

The preferred illuminating comprises lighting a control lamp with the first circuit for illuminating the photocell.

Lighting the control lamp preferably comprises conducting energy from the first circuit to a light emitting diode.

The preferred method of supplying electrical energy to electrical devices comprises energizing and deenergizing a first circuit from a power source and alternately connecting and disconnecting a second circuit to the first circuit.

The preferred method further comprises connecting one electrical device to a first circuit and connecting a similar electrical device to a second circuit, completing power to the first electrical device upon each energization of the first circuit and completing power to the second electrical device upon each energization of the second circuit concurrent with alternate energizations of the first circuit.

Preferably, turning on and off the second circuit comprises turning on and off fluorescent lights.

A preferred method of increasing and decreasing illumination comprises supplying power from a first circuit to an illumination device and supplying power from the first circuit to a secondary switching device and supplying power from the secondary switching device to a second illumination device and changing state of the secondary switching device upon each activation of the first circuit.

A preferred method of pulsing a solenoid comprises controlling current supplied to the solenoid with electronic control means including a photocell, lighting a lamp with power from a circuit connected to the electronic control means and illuminating the photocell with illumination from the lamp and turning the electronic control means off, supplying power to the solenoid while the electronic control means is on and interrupting power to the solenoid when the electronic control means is off.

A preferred apparatus for controlling illumination comprises a power source, a wall switch connected to the power source, a first conductor connected to the wall switch, a first light source connected to the first conductor, an alternate action switch connected to the first conductor, and a second conductor connected to the alternate action switch. The first conductor is energized with power from the power source upon each turning on of the wall switch. The second conductor is connected through the alternate action switch to the first conductor upon alternate energizations of the first conductor. The alternate action switch interrupts power from the first conductor to the second conductor upon other alternate energizations of the first conductor. Electrical control means connected to the first conductor and to the alternate action switch operates the alternate action switch upon energization of the first conductor. A second light source is connected to the second conductor The alternate action switch energizes the second conductor and second light source upon alternate energizations of the first conductor.

Preferably, the alternate action switch is an electromechanical switch, and the control means comprises a solenoid mechanically connected to the alternate action switch and electrically connected to the first conductor.

A control circuit is electrically connected between the solenoid and the first conductor.

Preferably, the control circuit comprises pulsing means connected between the first conductor and the solenoid for electrically pulsing the solenoid.

Preferably, the pulsing means comprises means for turning the control circuit off.

The preferred means for turning the control circuit off comprises a photocell connected to the control circuit.

An illumination means is connected to the first conductor for illuminating the photocell.

The above further and other objects and features of the invention are apparent in the disclosure which includes the above and ongoing description and claims and drawings.

BRIEF DESCRIPTION OF THE DRAWING

FIG. 1 is a schematic view of operation of the present system.

FIG. 2 is a schematic showing use of the present invention with fluorescent troffers.

FIG. 3 is a schematic view of the present invention as used with PL type fluorescent tubes as particularly used in down lights.

DETAILED DESCRIPTION OF THE DRAWING

Figure 4:
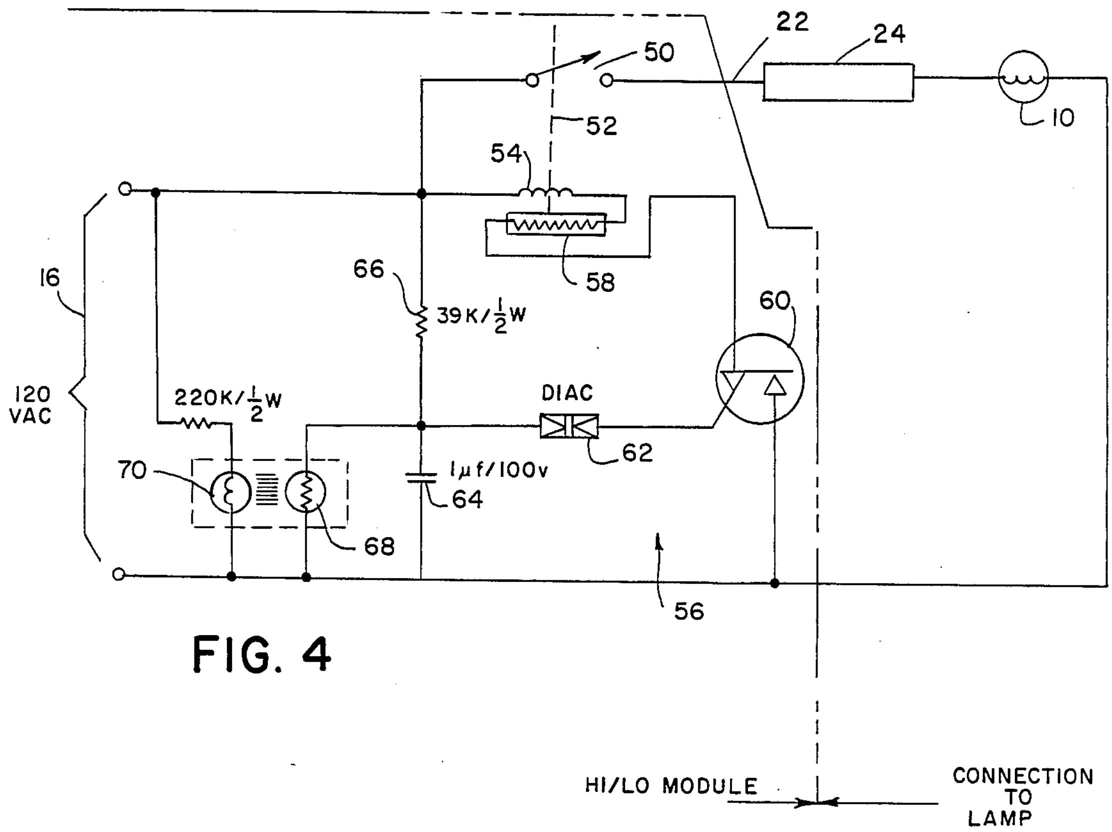
FIG. 4 is a schematic description of elements of the present invention.

Referring to FIG. 1, a control system is generally indicated by the numeral 1. A conventional wall-mounted switch 2 is mounted on a wall 4 and a conventional light fixture 6 having two light sources 8 and 10 is mounted on the ceiling 12.

The light sources 8 and 10 may be any appropriate light sources, for example, incandescent lamps, fluorescent lamps, PL type tubes or any other light sources or power-using devices.

The light sources may be arranged in first and second banks of light sources and, in FIG. 1, the numerals 8 and 10 represent banks of light sources. As an example, numerals 8 and 10 could each represent two fluorescent tubes in a single troffer or three fluorescent tubes each in a six-tube troffer. The light sources 8 and 10 may be similar or may be distinct. One light source, for example, may have one tube and another may have two tubes. One light source may be incandescent and the other light source may be fluorescent or other. Light sources 8 and 10 are intended to represent power-using devices. In one modification, the device schematically represented by dash lines and the numeral 8 may be the light source and the device schematically represented by numeral 10 may be another power-using device, for example, a fan in a bathroom. The power-using devices 8 and 10 may be motors on pumps, for example, when either one or two pumps would be used to pump fluid from one position to another according to the desired flow volume.

The wall switch 2 controls the application of power from a power source generally indicated by numeral 14 to a first circuit generally indicated by numeral 16.

The power from the first circuit 16 flows to the first receptacle or ballast generally indicated by numeral 18. The first circuit 16 is also connected to alternate action switch 20. The second circuit 22 is connected between alternate action switch 20 and socket or ballast 24.

As shown in FIG. 2, when the present system one is used with a fluorescent troffer or a bank of fluorescent troffers, the wall switch 2 supplies power from source 14 through first circuit 16. The first circuit 16 is connected to ballast 18 which provides power to operate two of the four fluorescent tubes 26. The first circuit 16 is also connected to alternate action switch 20 which supplies power through second circuit 22 to ballast 24 which supplies power to the two other fluorescent tubes. On every actuation of wall switch 2 which completes the circuit between source 14 and conductors 16, ballast 18 is energized. On alternate ON actuations of wall switch 2, ballast 24 is energized. When ballast 24 is energized, all four fluorescent lamps are energized. When it is desired to reduce the illumination from the fluorescent troffer 28, wall switch 2 is cycled OFF and ON. The turning of wall switch to ON cycles alternate action switch 20, interrupting power to second circuit 22 and to ballast 24, and only two of the four fluorescent tubes 26 are supplied with power from ballast 18.

Referring to FIG. 3, a down light 30 has PL type tubes 32 and 34 which are plugged into sockets 36 and 38. The sockets 36 and 38 are supplied with power from ballasts 40 and 42.

The electrically controlled alternate action switching apparatus is divided into two modules, 44 and 46, which contain respectively the electronic control circuit and the electromechanical switch and actuator.

As shown in FIG. 4, the preferred control system of the present invention is generally indicated by the numeral 20. The first circuit which supplies the switch is generally indicated by the numeral 16. The switching device comprises a commercially available electromechanical alternate action switch 50 which is mechanically connected 52 to a plunger of solenoid 54. Solenoid 54 is supplied with power from conductor 16 as controlled by the electronic control circuit generally indicated by the numeral 56. The electronic control circuit includes a thermal cutoff device 58 in series with the solenoid to interrupt the circuit to the solenoid upon experiencing excessive temperature.

A triac 60 is connected to supply power to the solenoid, as controlled by diac 62, which is connected to a control terminal of triac 60. One terminal of diac 62 is connected between capacitor 64 and resistor 66.

The solenoid 54 remains energized until photocell 68 is illuminated by light source 70, which may be a neon glow lamp or a light emitting diode.

In the ON state of the push on/push off switch 50, power is supplied from first conductor 16 to second conductor 22 and to ballast 24 and lamp 10.

Figure 5:
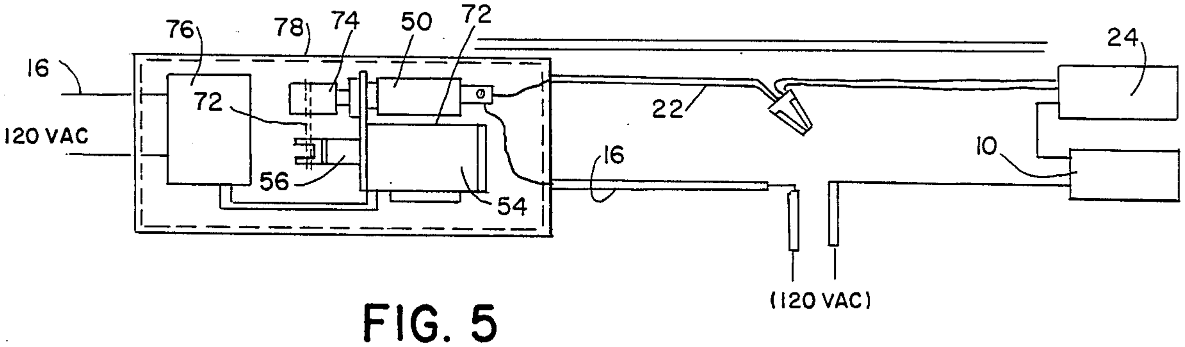
FIG. 5 is a schematic detail of the present invention as used with fluorescent lamps in conventional ceiling troffers.

Referring to FIG. 5, switch 50 and solenoid 54 are mechanically mounted side by side. Plunger 52 of the solenoid is mechanically interconnected 72 with switch plunger 74. When solenoid 54 is pulsed, switch 50 is cycled from ON/OFF or OFF/ON. The electronic control circuit is mounted in a module 76 and all are together packaged in a housing 78. Switch 50 alternately connectes first circuit 16 to second circuit 22, ballast 24 and lamp 10.

Figure 6:
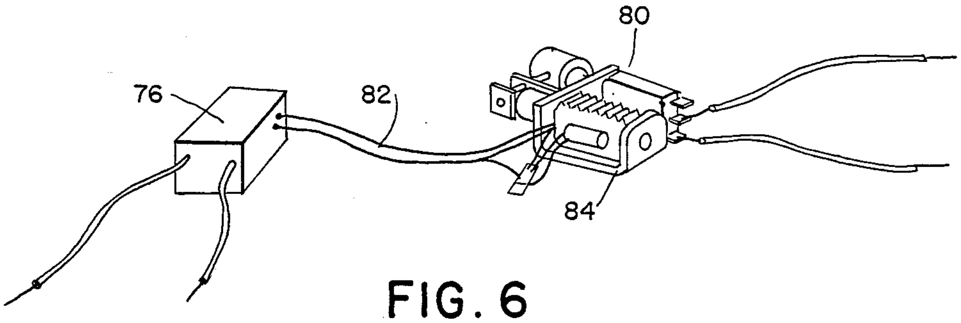
FIG. 6 is a schematic detail of the present invention as used with PL tubes for example in the down lights shown in FIG. 3.

In the system shown in FIG. 6, the solenoid-switch module 80 and the electronic control module 76 are separately mounted and are interconnected by conductors 82. The solenoid and switch are mechanically connected by a frame 84.

Figure 7:
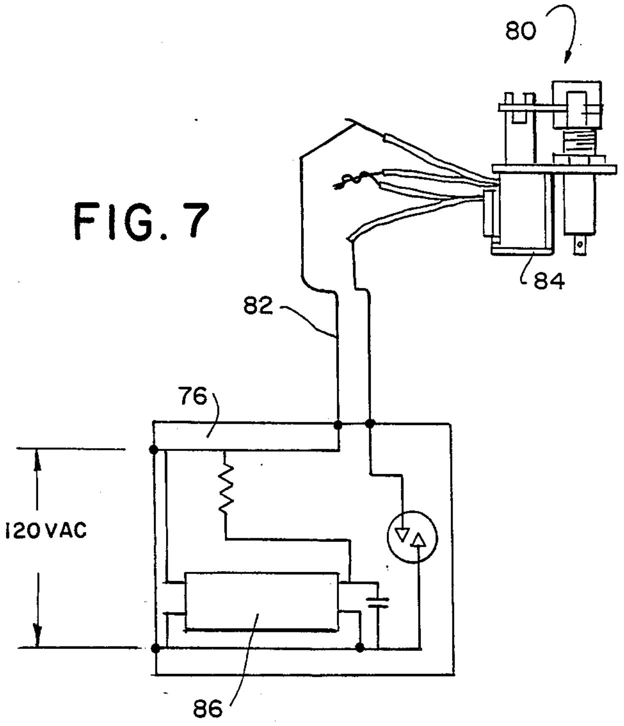
FIG. 7 is a schematic representation of the device shown in FIG. 6.

As shown in FIG. 7, the electronic control module 76 has a lamp and photocell module 86.

Figure 8:
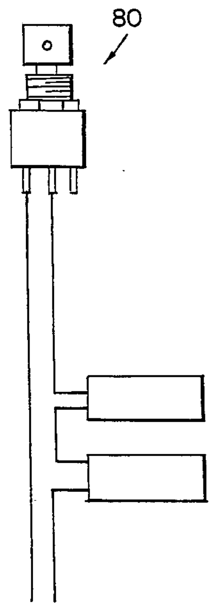
FIG. 8 is a schematic detail of a device used with a troffer.

A side view of the solenoid switch assembly 80 is shown in FIG. 8.

While the invention has been described with reference to specific embodiments, modifications and variations of the invention may be constructed without departing from the scope of the invention. The scope of the invention is defined in the following claims.

I claim:

1. The apparatus for alternately switching on and off electrical devices and groups of electrical devices comprising, first and second electrical circuits, an alternate action switch connected to the circuits and electrical means connected to the switch for alternating condition of the switch to alternately complete and interrupt the second circuit, wherein the alternate action switch comprises a push ON, push OFF mechanical switch and actuator means connected to the switch for actuating the switch on operations of the first circuit.

2. The apparatus of claim 1 wherein the electrical means comprises pulsing means for pulsing the actuator means.

3. The apparatus of claim 2 wherein the pulsing means comprises means for turning on the electrical means and means for turning off the electrical means.

4. The apparatus of claim 3 wherein the means for turning off the electrical means comprises a photosensitive device.

5. The apparatus of claim 4 wherein the means for turning off the electrical means further comprises an illuminating means.

6. The apparatus of claim 4 wherein the photosensitive means comprises means for changing resistance upon presence and absence of illumination and wherein the illuminating means comprises a light emitting diode.

7. The apparatus of claim 6 wherein a light emitting diode is connected to the first circuit to remain on during energization of the first circuit.

8. Control apparatus for switching on and off a second circuit upon alternate energizations of a first circuit comprising, an alternate action switch connected to the first circuit and to the second circuit for completing a pathway between the first and second circuits on alternate operations of the switch, wherein the alternate action switch comprises a push ON, push OFF mechanical switch and actuator means connected to the switch for actuating the switch on operation of the first circuit, control means connected to the alternate action switch for operating the switch, the control means being connected to the first circuit for operation of the control means when the first circuit is energized.

9. The control apparatus of claim 8 for switching on and off a second circuit upon alternate energizations of a first circuit comprising, an alternate action switch connected to the first circuit and to the second circuit for completing a pathway between the first and second circuits on alternate operations of the switch, control means connected to the alternate action switch for operating the switch, the control means being connected to the first circuit for energization when the first circuit is energized, and means connected to the first circuit and to the control means for deenergizing the control means after the control means has been energized.

10. The apparatus of claim 9 wherein the deenergizing means comprises delay means for delaying deenergization of the control means.

11. The apparatus of claim 10 wherein the delay means comprises electronic means connected to the first circuit and to the control means and photocell means connected to the electronic means for turning the electronic means off and disconnecting the control means from the primary circuit upon sensing illumination.

12. The apparatus of claim 11 further comprising an illumination source connected to the first circuit for illuminating when the first circuit is energized.

13. The method of turning on and off a second power circuit comprising, energizing and deenergizing a first load circuit, connecting the first circuit with the second circuit upon alternate energizations of the first circuit, connecting the first circuit to the second circuit through an alternate action switching means, switching the switching means upon energization of the first circuit, and electromechanically operating the switching means.

14. The method of claim 13 further comprising, electronically controlling actuation of the switching means.

15. The method of claim 14 further comprising, electronically disconnecting the switching means from the first circuit after operation of the switching means.

16. The method of claim 15 further comprising, illuminating a photocell in the electronic circuit to electronically disconnect the electronic circuit from the switching means.

17. The method of claim 16 wherein the illuminating comprises, lighting a control lamp with the first circuit for illuminating the photocell.

18. The method of claim 17 wherein the lighting the control lamp comprises conducting energy from the first circuit to a light emitting diode.

19. The method of increasing and decreasing illumination comprising, supplying power from a first circuit to an illumination device and supplying current from the first circuit to a secondary switching device and supplying current from the secondary switching device to a second illumination device and changing state of the secondary switching upon each activation of the first circuit.

20. A method of pulsing a solenoid comprising, controlling current supplied to the solenoid with electronic control means including a photoelectric cell, lighting a lamp with power from a circuit connected to the electronic control means and illuminating the photoelectric cell with illumination from the lamp and turning the electronic control means off, supplying power to the solenoid while the electronic control means is on and interrupting power to the solenoid when the electronic control means is off.

21. Apparatus for controlling illumination comprising, a power source, a wall switch connected to the power source, a first conductor connected to the wall switch, a first light source connected to the first conductor, an alternate action switch connected to the first conductor, a second conductor connected to the alternate action switch whereby the first conductor is energized with power from the power source upon each turning on of the wall switch and whereby the second conductor is connected through the alternate action switch to the first conductor upon alternate energizations of the first conductor and whereby the alternate action switch interrupts power from the first conductor to the second conductor upon other alternate energizations of the first conductor, electrical control means connected to the first conductor to the alternate action switch for operating the alternate action switch upon energization of the first conductor and a second light source connected to the second conductor whereby the alternate action switch energizes the second conductor and second light source upon alternate energizations of the first conductor.

22. The apparatus of claim 21 wherein the alternate action switch is an electromechanical switch and wherein the control means comprises a solenoid mechanically connected to the alternate action switch and electrically connected to the first conductor.

23. The apparatus of claim 22 further comprising, a control circuit electrically connected between the solenoid and the first conductor.

24. The apparatus of claim 23 wherein the control circuit comprises pulsing means connected between the first conductor and the solenoid for electrically pulsing the solenoid.

25. The apparatus of claim 24 wherein the pulsing means comprises means for turning the control circuit off.

26. The apparatus of claim 25 wherein the means for turning the control circuit off comprises a photocell connected to the control circuit.

27. The apparatus of claim 26 further comprising, illumination means connected to the first conductor for illuminating the photocell.

* * * * *